United States Patent
Shroll et al.

(10) Patent No.: US 11,355,263 B2
(45) Date of Patent: Jun. 7, 2022

(54) INSULATED SUBMARINE CABLE

(71) Applicant: JDR Cable Systems Ltd, Ely (GB)

(72) Inventors: Philip Shroll, Cambridge (GB); Mark Stanley, Cambridge (GB); James Young, Cambridge (GB); Jeremy Featherstone, Cambridge (GB)

(73) Assignee: JDR Cable Systems Ltd, Cambridgeshire (GB)

( * ) Notice: Subject to any disclaimer, the term of this patent is extended or adjusted under 35 U.S.C. 154(b) by 0 days.

(21) Appl. No.: 16/319,251

(22) PCT Filed: Jul. 21, 2017

(86) PCT No.: PCT/GB2017/052149
§ 371 (c)(1),
(2) Date: Jan. 18, 2019

(87) PCT Pub. No.: WO2018/015769
PCT Pub. Date: Jan. 25, 2018

(65) Prior Publication Data
US 2019/0237217 A1 Aug. 1, 2019

(30) Foreign Application Priority Data
Jul. 21, 2016 (GB) ..................... 1612689

(51) Int. Cl.
*H01B 7/14* (2006.01)
*H02G 1/14* (2006.01)
(Continued)

(52) U.S. Cl.
CPC ............... *H01B 7/14* (2013.01); *H01B 3/441* (2013.01); *H01B 7/282* (2013.01); *H02G 1/14* (2013.01);
(Continued)

(58) Field of Classification Search
CPC .......... H01B 7/14; H01B 7/282; H01B 3/441; H02G 9/00
See application file for complete search history.

(56) References Cited

U.S. PATENT DOCUMENTS

| 1,818,127 A | 8/1931 | Gilbert |
| 3,874,960 A | 4/1975 | Matsuzaki et al. |

(Continued)

FOREIGN PATENT DOCUMENTS

| CN | 101548344 A | 9/2009 |
| CN | 202275636 U | 6/2012 |

(Continued)

*Primary Examiner* — William H. Mayo, III
*Assistant Examiner* — Rhadames Alonzo Miller
(74) *Attorney, Agent, or Firm* — Stetina Brunda Garred and Brucker

(57) ABSTRACT

The invention relates to insulated submarine cables including conductive cores (3a, 3b) and insulating material (5a, 5b) surrounding the conductive cores (3a, 3b). Such an insulated cable includes a first length and a second length. The cable has a roughly constant core (3a) cross-sectional area A1 and a roughly constant insulating material (5a) thickness T1 along the first length, and a different roughly constant core (3b) cross-sectional area A3 and/or a different roughly constant insulating material (5b) thickness T2 along the second length. The cable may include one or more other lengths which join the first length and the second length to one another.

17 Claims, 9 Drawing Sheets

(51) Int. Cl.
*H01B 3/44* (2006.01)
*H01B 7/282* (2006.01)
*H02G 9/00* (2006.01)
*H02G 15/18* (2006.01)
*H02G 15/14* (2006.01)
*H02G 1/10* (2006.01)

(52) U.S. Cl.
CPC ............... *H02G 9/00* (2013.01); *H02G 1/10* (2013.01); *H02G 15/14* (2013.01); *H02G 15/18* (2013.01)

(56) References Cited

U.S. PATENT DOCUMENTS

| | | | | |
|---|---|---|---|---|
| 4,224,462 | A * | 9/1980 | Occhini | H01B 7/14 174/25 G |
| 2004/0091707 | A1* | 5/2004 | Perego | H01B 3/441 428/375 |
| 2009/0272780 | A1* | 11/2009 | Crawford | B66C 13/14 226/4 |
| 2015/0101843 | A1* | 4/2015 | Olsen | H01B 7/045 174/109 |
| 2016/0039184 | A1* | 2/2016 | Tailor | B32B 27/32 428/355 N |
| 2016/0254653 | A1* | 9/2016 | Worzyk | H02G 1/10 174/70 R |

FOREIGN PATENT DOCUMENTS

| | | | |
|---|---|---|---|
| EP | 0173402 | 5/1986 | |
| EP | 0510453 | 10/1992 | |
| EP | 3098820 A1 | 11/2016 | |
| GB | 623971 | 5/1949 | |
| GB | 2017388 | 10/1979 | |
| JP | 2009054422 A | 3/2009 | |
| JP | 2009076439 A | 4/2009 | |
| JP | 2012022820 | 2/2012 | |
| JP | 2012022820 A * | 2/2012 | ............. H01B 7/14 |

* cited by examiner

INSULATED SUBMARINE CABLE

CROSS-REFERENCE TO RELATED APPLICATIONS

The present application claims priority to PCT International Application No. PCT/GB2017/052149 filed on Jul. 21, 2017, which claims priority to GB1612689.8 filed Jul. 21, 2016, the entirety of the disclosures of which are expressly incorporated herein by reference.

STATEMENT RE: FEDERALLY SPONSORED RESEARCH/DEVELOPMENT

Not Applicable.

FIELD OF THE INVENTION

This invention relates to insulated cables. In particular, it relates to an insulated cable including a conductive core and insulating material surrounding the core, wherein the cable includes lengths having different core cross-sectional areas throughout its continuous length. The lengths may additionally or alternatively have different thicknesses of insulating material surrounding their respective cores throughout its continuous length.

BACKGROUND OF THE INVENTION

Insulated cables have applications in numerous fields. For example, insulated cables may be used in submarine (i.e. subsea) or subterranean conditions, such as for serving an offshore wind farm, an offshore oil or gas rig, a mining facility, or another location to or from which electrical power must be transported.

The lifetime over which such insulated cables can be used is limited by a number of factors. One such factor is that the insulating material in the cable, when subjected to a voltage, experiences dielectric stress. Exposure to a dielectric stress greater than the material's dielectric strength will cause the material to break down and its insulating properties to fail. Similarly, prolonged exposure to dielectric stress at or below the material's dielectric strength will eventually cause the material to break down and its insulating properties to fail. This could render the insulated cable ineffective and dangerous.

The performance of the insulating material in terms of dielectric strength is also dependent on the extent to which the dielectric (electrical insulating material) can remain dry during its lifetime. For some submarine cable designs and often for higher voltages it is normally expected that the cable must possess the ability to prevent water permeating through its outer surface and reaching the critical portions of the cable, i.e. the principal electrical insulating material or dielectric, when immersed in water.

Traditionally, to prevent water permeating through the cable and reaching the electrical insulating material, the cable and/or the individual power cores have been coated with or wrapped in a waterproofing material such as lead or a pitch (e.g. asphalt or bitumen), forming a hermetic moisture barrier. However, such materials can have significant drawbacks in that they can make a cable heavy and/or difficult to manoeuvre and install. Such materials can also fracture or disintegrate where the cable is able to move in use, compromising their waterproofing properties. Furthermore, some materials such as Lead are becoming less desirable due to their harmful effects on the environment as well for operators and manufacturers.

An alternative approach is to omit the lead or other such waterproofing materials, accepting that some water or water vapour may permeate into a cable and to instead manage the associated effects. One of these effects is the permeability of the insulating material to water. In some materials, when water infiltrates a material at a given point, it propagates radially away from the point. The shape of the propagation has been likened to that of a tree, thus the propagation pattern is often referred to as a "moisture-tree" or more specifically a "water-tree". Materials that are resistant to water propagation are also referred to as being "water-tree retardant".

Dependent on the efficacy of the water-tree retardant material's breakdown strength, this type of design can provide benefits in terms of reduced diameter and weight of cable as well as improve reactance benefits in the case where a hermetic Lead sheath does not need to be employed to ensure watertightness.

An insulated cable's dielectric strength is also affected by the operating temperature of the cable, which is dependent on the cable's ability to dissipate heat. Typically, an insulated cable with standard polymeric insulation materials such as XLPe (Cross-linked polyethylene) or EPR (Ethylene propylene rubber) cannot operate at continuous temperatures greater than 90° C. without the risk of failure of the dielectric. In the design of such insulated cables, the cable is sized such that these temperature limits are not exceeded, and therefore the cable's ability to dissipate heat is a key characteristic in the design.

The ability of an insulated cable to dissipate heat depends on a number of factors, including the thickness and other properties of the conductive core; the thickness and other properties of the insulating material forming part of the cable; the thickness and other properties of any shrouds or casings which enclose the insulated cable (e.g. to protect or guide it); the environment in which the insulated cable is used (e.g. in water, in air, or buried in earth/sand to a greater or lower depth); and the proximity of other heat sources (e.g. other cables, geothermal features, sunlight, etc.). Standards such as IEC60287 enable the cable or system designer to define the current rating of the cable considering its material composition and the environment in which it is intended to be used.

Other factors affecting an insulated cable's dielectric strength include mechanical stresses applied to the cable. A cable which is placed under axial tension, for example, is likely to exhibit dielectric failure more quickly than a cable which is not placed under axial tension. A cable which is placed under compressive stress has also been demonstrated to be likely to fail less quickly than a cable which is placed under tensile stress.

One or more of the factors discussed above may vary over the entire length of a given insulated cable, especially for subsea applications. For example, with topside platform to subsea cables some sections of an insulated cable may be in air, enclosed within a casing and under axial tension; other sections may be in water, enclosed within a casing and under axial tension; and further sections may be in water, not enclosed within a casing and under compressive stress due to hydrostatic pressure at the operational water depth.

The sections which are under axial tension perform, relatively, much worse in wet-ageing tests than the sections which are under compressive stress. The compressive stress has been shown to result in a differential rate with regard to wet-age performance of the cable.

This means that, for subsea applications, reliability of a subsea cable with specific insulation thickness and core cross-sectional areas (throughout its length) will be limited by those portions which are in the harshest environment, and subjected to the highest electrical, mechanical and thermal stresses. The cable reliability will be greater in those sections which are under compressive stress due to pressure exerted by the water above the cable than for the sections of the cable which are descending to/ascending from the seabed and therefore under axial tension to support their own weight. Similarly, sections in air will have less effective cooling than sections under water and so will tend to run at a higher temperature for a given electrical load. The same will apply for sections exposed to external heat sources such as solar radiation.

To ensure that a cable operates safely for a predetermined period of time, a cable manufacturer determines the dielectric strength required to make the cable operate safely for that predetermined period of time with the worst combination of factors that the cable will experience during use. For example, the worst combination of factors a given cable will experience might be in air, within a casing and under axial tension. The cable manufacturer determines the dielectric strength required to enable the cable to operate safely in these conditions for the predetermined lifetime of the cable, chooses the required core material, core thickness, insulating material and insulating material thickness, and manufactures the entire length of cable to that standard.

Manufacturing an entire length of cable to one standard has previously been considered as advantageous for multiple lengths and reduced lead-times. However, the offshore energy industry is continually seeking to reduce cost. Clearly, design optimisation can offer cost reduction benefits and it is disadvantageous for parts of the cable to be over-specified throughout large portions of the cable. For example, making the insulating material thicker than it needs to be for a large portion of the cable makes the cable more expensive to manufacture, with reduced line speeds, more expensive to transport, and more expensive to install. Moreover, only some lengths of the cable (i.e. the lengths where the cable experiences the worst combination of factors discussed above) will be at the end of their life when the cable as a whole reaches the end of its serviceable life, since only some lengths of the cable will have been at or near the temperature threshold of the cable (which is uniform along the length of the cable). This means that lengths of serviceable cable might be replaced unnecessarily.

This is particularly inefficient for long cables connecting distant points where their parameters might be constrained by the requirements of the sections at each end. For example a long cable may connect two platforms which is hundreds of metres or more in length. At either end of such cables there may be short lengths (e.g. of the order of tens of metres) where thick insulation is required due to those lengths being e.g. in air, exposed to sunlight, protected by a casing and under axial tension. However, a significant length of the cable may have much lower insulation requirements—if, for example, it runs along the seabed where there is little to no sunlight exposure, no protective casing and compressive stress rather than axial tension. In order for the cable to meet the safety requirements for the short lengths, the entire cable is manufactured to the standard required for the short lengths, meaning that the hundreds of metres or more of cable under the sea are unnecessarily heavily insulated.

In some offshore configurations it may be necessary to connect sections of cable together with a mechanical joint section to achieve a longer length of cable run on the seabed. This type of mechanical joint is characterised by the need to terminate the cable reinforcement each end into a rigid "can" section several metres in length and with an increased diameter. Whilst this type of jointing system aids the continuation of electrical power through the cable system, the presence of such a rigid mechanical joint serves to present additional challenges in terms of handling on deck and over-boarding during installation, such that additional time and care needs to be taken when such a rigid joint is deployed.

The present invention aims to overcome or at least ameliorate one or more of the problems set out above.

SUMMARY OF THE INVENTION

According to the present invention there is provided an insulated submarine cable including a conductive core and insulating material surrounding the core, wherein the cable includes: a first length along which the core has a cross-sectional area $A1$ and the insulating material has a thickness $T1$; and a second length along which the core has a cross-sectional area $A3$ and the insulating material has a thickness $T2$, wherein at least one of the cross-sectional area $A1$ and the thickness $T1$ of the first length is greater than the respective cross-sectional area $A3$ and thickness $T2$ of the second length.

Advantageously, the different lengths of the cable are manufactured to different standards according to the conditions in which those lengths of the cable will be used. For instance, the first length may hang from an offshore platform and descend to the seabed, and the second length may lie along the seabed. The first length may therefore be manufactured to a standard required for a cable which is in air, under axial tension and exposed to sunlight, and the second length may therefore be manufactured to a standard required for a cable which is submerged in water, under compressive pressure and exposed to little or no sunlight. This may help ensure that no length of the cable is over- or under-insulated, that each length has an appropriate core cross-sectional area or thickness, and/or that the dielectric strength of the cable at different cross sections along the length of the cable is appropriate for the conditions that cross section will experience.

In some embodiments, the cross-sectional area $A1$ is greater than the cross-sectional area $A3$. In some such embodiments, the thickness $T1$ is greater than the thickness $T2$. Advantageously the cross-sectional areas and/or the thicknesses may be chosen to achieve the required dielectric strength for the different lengths of cable.

Optionally, the insulated submarine cable additionally includes a third length, between the first length and the second length, along which the core changes in cross-sectional area from $A1$ to $A3$. In some such embodiments, the thickness of the insulating material remains substantially constant along the third length.

Optionally, the insulated submarine cable additionally includes a fourth length, between the third length and the second length, along which the thickness of the insulating material changes from $T1$ to $T2$. In some such embodiments, the cross-sectional area of the core remains constant along the fourth length.

In some embodiments, the insulated submarine cable includes a filler length comprising filler material provided around the insulating material and extending along the fourth length and a portion of the second length, wherein the filler material increases in thickness as the insulating material surrounding the core decreases in thickness. The cross-sectional area of the cable may therefore remain constant along the fourth length. Advantageously, this may reduce variations in the mechanical properties of the cable along the fourth length. That may make handling and/or installation of the cable easier.

Preferably, the portion of the core in the third length includes an induction-brazed taper joint. Advantageously, this may provide an optimal form of joint between the cores of the first and second lengths of the cable. The process of forming the joint may be highly localised and therefore advantageously have a minimal impact on neighbouring sections of the cable. The process of forming the joint may be more energy efficient than other processes for forming joints.

In some embodiments, the lengths are distributed axially along the cable over a distance of between 1 metre and 20 metres.

Preferably, the first length is or forms part of a first cable section, the first cable section having a constant core cross-sectional area A1 and a constant insulating material thickness T1; the second length is or forms part of a second cable section, the second cable section having a constant core cross-sectional area A3 and a constant insulating material thickness T2; and the third, fourth and filler lengths are or form parts of a joint connecting the first cable section and the second cable section.

The insulating material is preferably a polymer material and more preferably a water tree-retardant polymer to inhibit development of water trees and hence the ingress of water into the insulating material. The insulating material may be a water tree-retardant ethylene based polymer. For example, the insulating material may be polyethylene (PE), cross-linked polyethylene (XLPE), ethylene propylene rubber (EPR) or an ethylene propylene diene monomer (EPDM). The use of such insulating material allows the insulating material to provide to operate in an environment where water may be present avoiding the need to additional water barriers to surround the insulating material. In other words, the insulating material does not need to be maintained in an environment which is hermetically sealed from the environment the outside, i.e. water for a subsea cable. This allows cables which do not need a Lead based layer to be provided around the insulating material, allowing a Lead-free or reduced Lead cable to be provided.

According to the invention there is also provided a cable bundle comprising a plurality of insulated cables.

Preferably, the cables in the bundle are arranged such that the respective third lengths of each of the cables, located between the first length and the second length of the cable and along which the core changes in cross-sectional area, are positioned such that they do not coincide with each other at the same axial position along the cable bundle.

Preferably, the cables in the bundle are arranged such that the respective fourth lengths of each of the cables, located between the first and second lengths of the cable and along which the insulating material of the cable changes in thickness and filler material surrounding the insulating material changes in thickness, are positioned such that they do not coincide with each other at the same axial position along the cable bundle.

Advantageously, this staggering of the third and/or fourth lengths may help ensure that a stiffer section of one cable lengths (such as a joint section of the cable, which may incur a localised stiffness increase) does not damage part of a neighbouring cable in the cable bundle.

Preferably, the respective filler lengths of the cables, extending along the respective fourth length and a portion of the respective second length, are positioned to such that they at least partially overlap each other along a portion of the cable bundle.

Optionally, the cables in the cable bundle may be helically or oscillatorily (e.g. where the cables exchange positions with one and other along the length of the cable) intertwined.

As noted above, by using a "wet" design, where an acceptance that water may reach the insulating material means that the bundle of cables and any layer surrounding the bundle are not required to provide a hermetically sealed environment within the cable. This again means that the outer layers do not need to be highly water resistant and allows the avoidance of materials such as Lead.

BRIEF DESCRIPTION OF THE DRAWINGS

The present invention will now be described in detail by reference to examples, in which:

FIG. 6b schematically shows a magnified section of the cable bundle of FIG. 6a;

DETAILED DESCRIPTION

Figure 1:
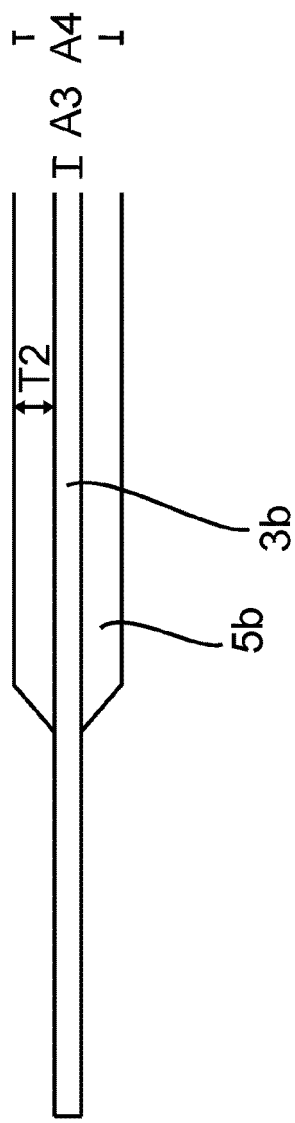
FIG. 1 schematically shows two separate lengths of insulated cable.
Figure 1:
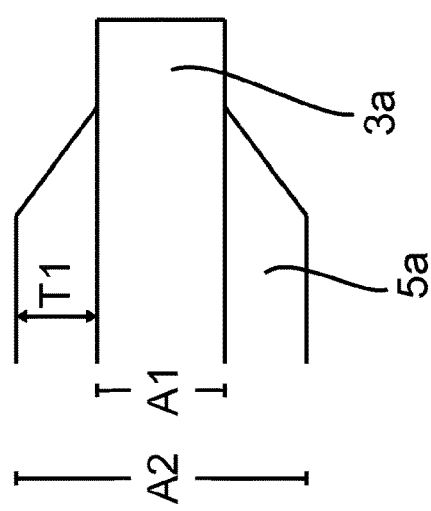

FIG. 1 schematically shows two separate sections of insulated cable. The first section of insulated cable (illustrated on the left-hand side of FIG. 1) includes a conductive core 3a (sometimes referred to as the conductor) and insulating material 5a surrounding the conductive core. The conductive core of the cable is usually made of a conductive metal but may be made from a non-metallic conductor such as carbon nano-tube technology. The conductive core 3a of the first section of insulated cable has a substantially constant cross-sectional area A1. The first section of insulated cable has a substantially constant overall cross-sectional area A2 and insulator thickness T1.

The second section of insulated cable (illustrated on the right-hand side of FIG. 1) also includes a conductive core 3b and insulating material 5b surrounding the conductive core. The core 3b of the second section of insulated cable has a substantially constant cross-sectional area A3, and the second section of insulated cable has a substantially constant overall cross-sectional area A4 and insulator thickness T2. Core cross-sectional area A1 is greater than core cross-sectional area A3, and insulator thickness T1 is greater than insulator thickness T2.

It will be appreciated that these sections of cables are simplified to show the important elements and may include additional layers of materials which are not shown.

As illustrated in FIG. 1, part of the insulating material 5a surrounding core 3a on the first section of cable (left-hand side of FIG. 1) has been cut away to leave an uninsulated protrusion of core 3a. Similarly, part of the insulating material 5b surrounding core 3b on the second section of cable (right-hand side of FIG. 1) has been cut away to leave an uninsulated protrusion of core 3b.

The two ends of the respective cables of FIG. 1 are joined together, to form a composite cable.

Figure 2:
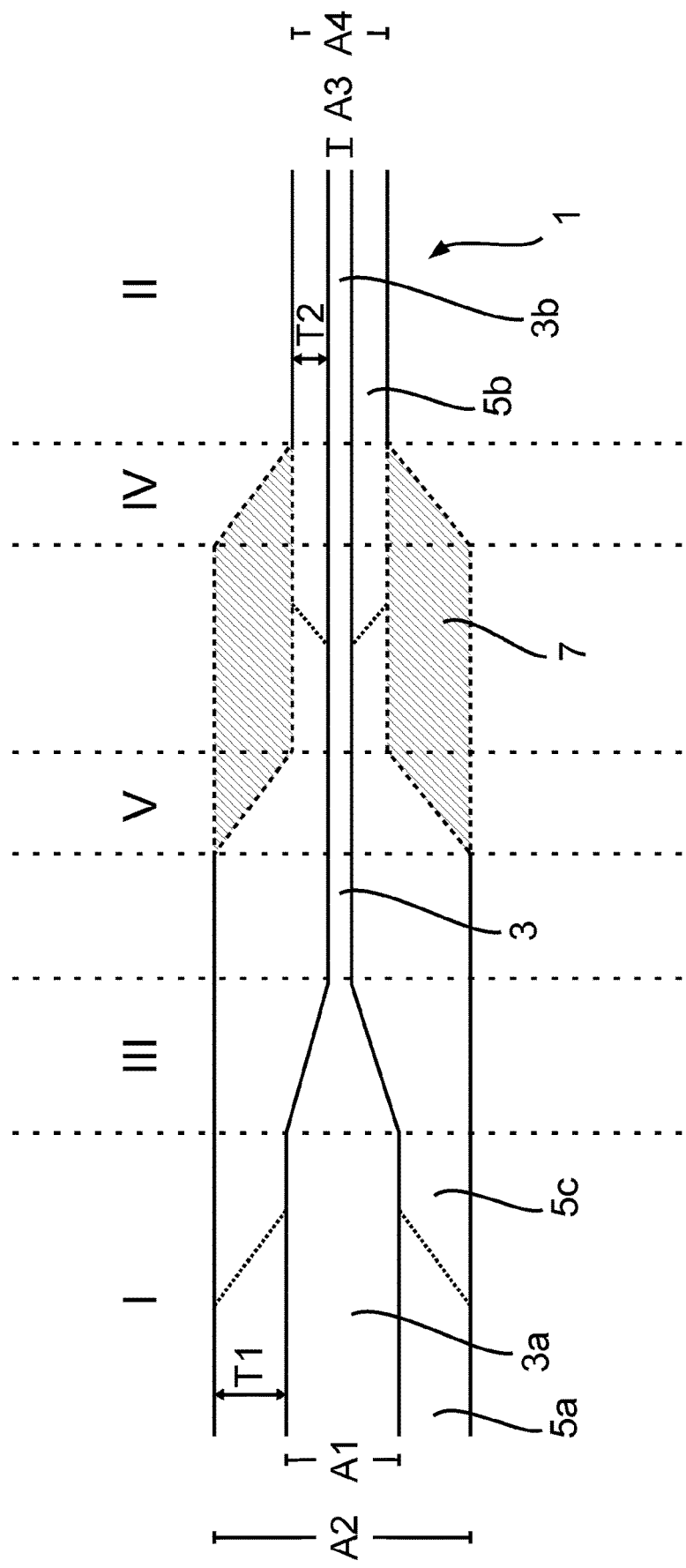
FIG. 2 schematically shows a cross-sectional view of an insulated cable according to an embodiment of the invention.

FIG. 2 schematically illustrates, in cross-section, part of a single composite cable 1 including a conductive core 3, insulating material 5(5a, 5b, 5c) surrounding the core 3, and filler material 7 surrounding the insulating material 5 along a portion of the cable 1. The single cable 1 includes the two separate sections of insulated cable illustrated in FIG. 1, with a joint connecting to the sections of insulated cable. The single cable 1 is described in more detail below.

Cable 1 includes a first length (labelled 'I') along which the core 3 has a roughly constant cross-sectional area A1 and the insulator 5a has a roughly constant thickness T1. Cable 1 also includes a second length (labelled 'II') along which the core 3 has a roughly constant cross-sectional area A3 and the insulator 5b has a roughly constant thickness T2. As illustrated in FIG. 2, cross-sectional area A1 is greater than cross-sectional area A3, and thickness T1 is greater than thickness T2.

In the example of FIG. 2, cable 1 includes a third length (labelled 'III'). The third length is located between the first length and the second length along the axis of the cable 1. The core 3 changes in cross-sectional area along the third length, from A1 to A3. In the illustrated example, the conductive core 3 tapers continuously along the third length. The diameter of the conductive core 3 (which, in this example, is circular in cross-section) reduces progressively along the length of the third section. The cross-sectional area A2 of the cable 1 remains substantially constant along the third length.

Cable 1 of FIG. 2 also includes a fourth length (labelled 'IV'). The fourth length is located between the third length and the second length along the axis of the cable 1. The cable 1 changes in cross-sectional area along the fourth length, from A2 to A4. In the illustrated example, the cable tapers along the fourth length. The diameter of the cable 1 (which, in this example, is circular in cross-section) reduces along the length of the fourth section. The cross-sectional area of the core 3 remains substantially constant along the fourth length.

Cable 1 of FIG. 2 also includes a fifth length (labelled 'V'). The fifth length is located between the third length and the fourth length along the axis of the cable 1. The insulating material 5 surrounding the core 3 changes in thickness along the fifth length. Filler material 7 (shown as hatched areas in FIG. 2) surrounding the insulating material 5 also changes in thickness along the fifth length. In the illustrated example, moving from left to right along the fifth length, the insulating material 5 decreases in thickness at substantially the same rate that the filler material 7 increases in thickness. This simultaneous change in thickness of the insulating material 5 and the filler material 7 at the same rate means that the cross-sectional area of the overall cable 1 remains substantially constant along the fifth length despite the reduction in thickness of the insulating material 5. The cross-sectional area of the core 3 also remains substantially constant along the fifth length.

The first length of the cable 1 is or forms part of a first cable section. The first cable section has a substantially constant core cross-sectional area A1 and a substantially constant insulator thickness T1 along its entire length. The first cable section is manufactured in one piece and may be joined to one or more other cable sections at another end of the first cable section.

The second length of the cable 1 is or forms part of a second cable section. The second cable section has a substantially constant core cross-sectional area A3 and a roughly constant insulator thickness T2 along its entire length. The second cable section is manufactured in one piece and may be joined to one or more other cable sections at another end of the second cable section.

The third, fourth and fifth lengths of the cable 1 form parts of a joint in the cable. The joint connects a first cable section (including the first length 'I') to a second cable section (including the second length 'II'). The first cable section corresponds to the first (separate) section of insulated cable illustrated on the left-hand side of FIG. 1, and the second cable section corresponds to the second (separate) section of insulated cable illustrated on the right-hand side of FIG. 1.

The diagonal lines of FIG. 1, showing where insulating material had been shaped (either by cutting the material back or forming in the desired shape) to expose the conductive cores 3 of the first and second sections of cable, have been included in FIG. 2 as dashed lines. As explained in more detail below, the insulating material of the first section 5a and the second section 5b are fused together via additional insulating material 5c in the joining process, so as to form a homogeneous structure along the axis of the cable 1. The dashed lines in FIG. 2 indicate the configuration of the insulating material of the first and second sections prior to the joining of the sections and the re-constitution and curing of the insulating material.

In the part of the joint formed by the third length, the core 3 changes in cross-sectional area, from A1 to A3. In this example, an induction-brazing technique is used to join the conductive core of the first section (which has cross-sectional area A1) to the core of the second section (which has a different cross-sectional area A3). The induction-brazed joint provides a tapered section of core to effect the change in cross-sectional area. This may be formed using an intervening tapered section of conductive material such as copper placed between the first section of cable and the second section of cable and brazed at each end so that a continuous core is a formed.

After the core 3 of the first section of cable has been joined to the core 3 of the second section of cable, insulating material 5c is applied to the exposed core 3 to provide the insulator structure illustrated in FIG. 2. Insulating material 5c is bonded and cured to the insulating material 5a, 5b so that the insulating properties of the insulating material 5 are uniform along the axis of the cable 1. Material is applied by building-up tapes to reconstitute the thickness, or alternatively through moulding the material.

In the part of the joint formed by the fifth length, the outer diameter and thickness of the insulator is reduced along the length of the fifth length. At the end of the fifth length, the insulator material 5c has a cross-sectional area similar to that of the insulator 5b on the right hand section of cable. The new insulator 5c is then extended at a substantially constant cross-sectional area up to where it meets the original insulator material 5b shown by the angled dashed line.

The reduction in the cross sectional area in the fifth length ensures that the insulator material 5c extends beyond the third length before its dimensions change.

In the part of the joint formed by the fifth length, the cable 1 does not change in overall cross-sectional area, and the core 3 does not change in cross-sectional area. From left to right along the fifth length, filler material 7 is used to compensate for the reduced size of the cable and to effectively maintain the thickness of the cable at a constant rate. The filler material 7 changes in thickness at a rate to compensate for the change in thickness of the insulating material 5. The filler material extends from the part of the joint formed by fifth length to the part of the joint formed by fourth length.

In the part of the joint formed by the fourth length, the cable 1 changes in cross-sectional area from A2 to A4. From left to right along the fourth length, the layer of filler material 7 surrounding the insulating material 5 reduces in thickness, so that the cross sectional area of the cable 1 reduces along the fourth length. The filler reduces in thickness until it ends leaving the insulating material 5b exposed.

The arrangement shown in FIG. 2 means that the change in the core cross-sectional area does not take place over the same length of cable as the change in insulation layer thickness, and also that they do not take place over the same length of cable as the change in the overall cable cross-sectional area. As a consequence, any changes in external profile of the cable 1 (e.g. bulges or depressions in the cable's exterior) and any changes in the mechanical properties of the cable (e.g. changes in stiffness or flexibility) caused by the change in cross-sectional area of the core 3, change in thickness of the insulating material 5, and the change in cross-sectional area of the cable 1 do not all occur at the same axial position along the cable. This helps to reduce or avoid any concentration of both mechanical and electrical stress on the various parts of the cable.

Figure 3:
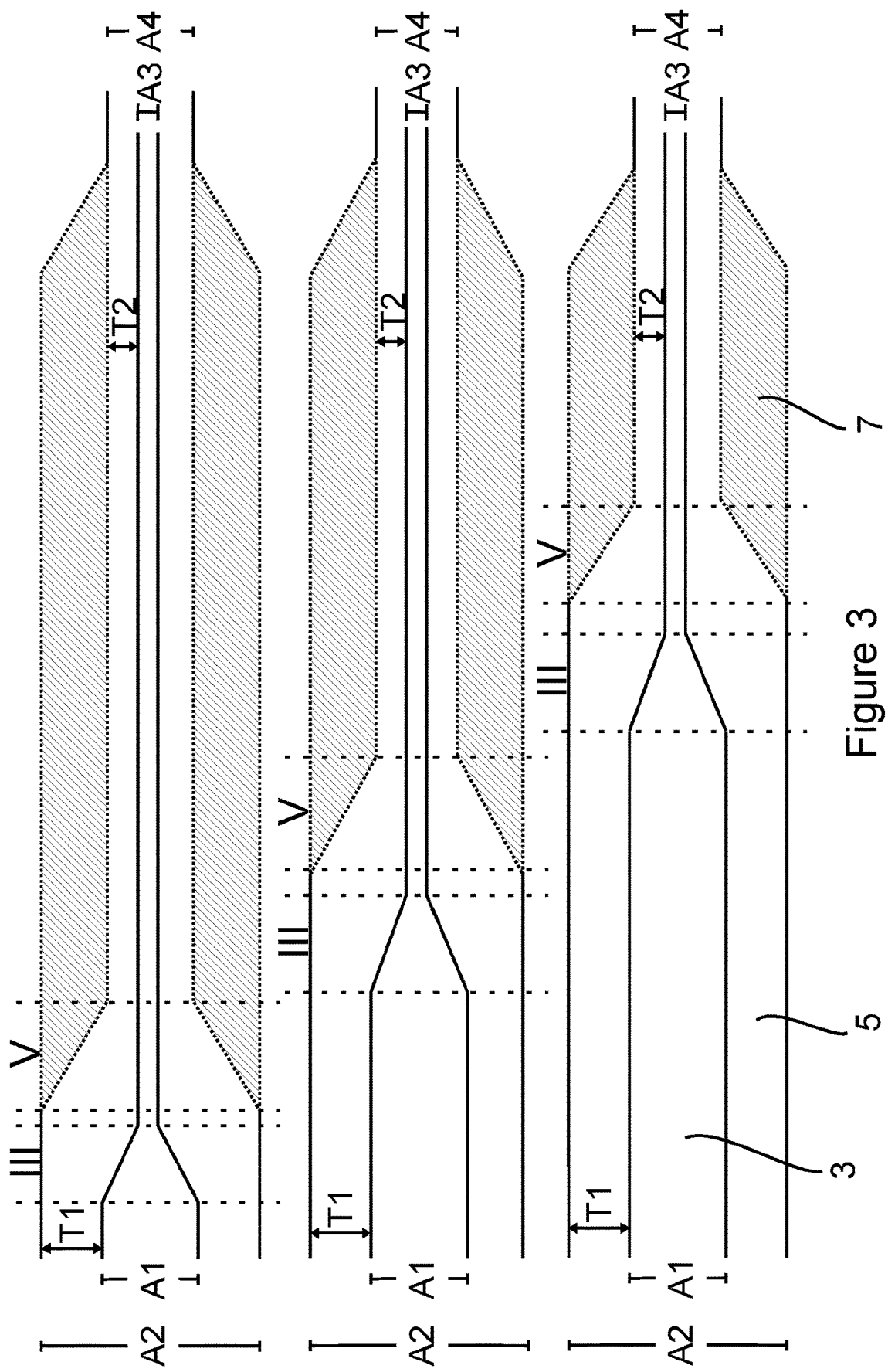
FIG. 3 schematically shows a cross-sectional view of a cable bundle including a plurality of cables according to an embodiment of the invention.

The arrangement shown in FIG. 2 shows a fairly simple single core cable in accordance with the invention. However, many cables are composite cables which may include a number of cores similar to those of FIG. 2 and potentially a number of other elements such as data cables, optical fibres, air hoses and so on. A simplified composite cable according to the invention with a bundle of insulated cables similar to those of FIG. 2 is described below FIG. 3 shows a schematic view of a cable bundle including three insulated cables. Each of the three insulated cables includes a first length, a second length, a third length, a fourth length and a fifth length as described in the context of the cable 1 of FIG. 2. The cables are enclosed in a casing (not shown) which holds the cables in the bundle.

The cables in the bundle are arranged such that a third (III) length of one of the three insulated cables does not coincide with a third (III) length of any other of the three insulated cables at the same axial position along the cable bundle. In other words, the third (III) lengths of the cables (where the core cross-sectional areas change) are at different axial positions along the cable bundle. The third length of the upper cable in FIG. 3 is positioned close to the left-hand side of FIG. 3. The third length of the middle cable is positioned to the right of the third length of the upper cable. The third length of the lower cable is positioned to the right of the third length of the middle cable (and therefore also to the right of the third (III) length of the upper cable).

The cables in the bundle are also arranged such that the fifth (V) lengths of the upper, middle and lower cables do not coincide with one another at the same axial position along the cable bundle, and also so that the fifth (V) lengths do not coincide with any of the third lengths of the cables. The fifth length of the upper cable is positioned to the right of the third length of the upper cable and to the left of the third length of the middle cable. The fifth length of the middle cable is positioned to the right of the third length of the middle cable and to the left of the third length of the lower cable. The fifth length of the lower cable is positioned to the right of the third length of the lower cable.

In the example of FIG. 3, each of the cables in the cable bundle includes filler material 7. As in the example of FIG. 2, filler material 7 on any given cable in the cable bundle increases in thickness along a fifth length of the given cable, and insulating material 5 on the given cable decreases in thickness along the fifth length. Because the filler material increases in thickness at the same rate that the insulating material decreases in thickness, the cross-sectional area of the cable remains roughly constant along the fifth length.

Arranging the cables in the cable bundle so that the third lengths do not coincide with each other or with the fifth lengths ensures that any changes in external profile (e.g. bulges or depressions) or mechanical properties (e.g. stiffness or flexibility) of the respective cables do not occur at the same axial position along the cable bundle. Instead these changes are distributed along a length of the cable bundle. This makes the external profile and mechanical properties of the cable bundle more uniform along its length (particularly over the transitional portion of the cable). This leads to less stress concentration on the casing of the cable bundle, less stress on the cables within the cable bundle caused by the other cables in the bundle, and improved manoeuverability of the cable bundle.

The fourth lengths (where the filler material decreases in thickness) of the three cables coincide at roughly the same axial position along the cable bundle. In the illustrated example, this occurs towards the right-hand side of FIG. 3. The cable bundle casing (which encloses the three cables) can reduce in cross-sectional area at, or slightly to the right of, the axial position along the cable bundle where the fourth lengths of the cables coincide.

Figure 4:
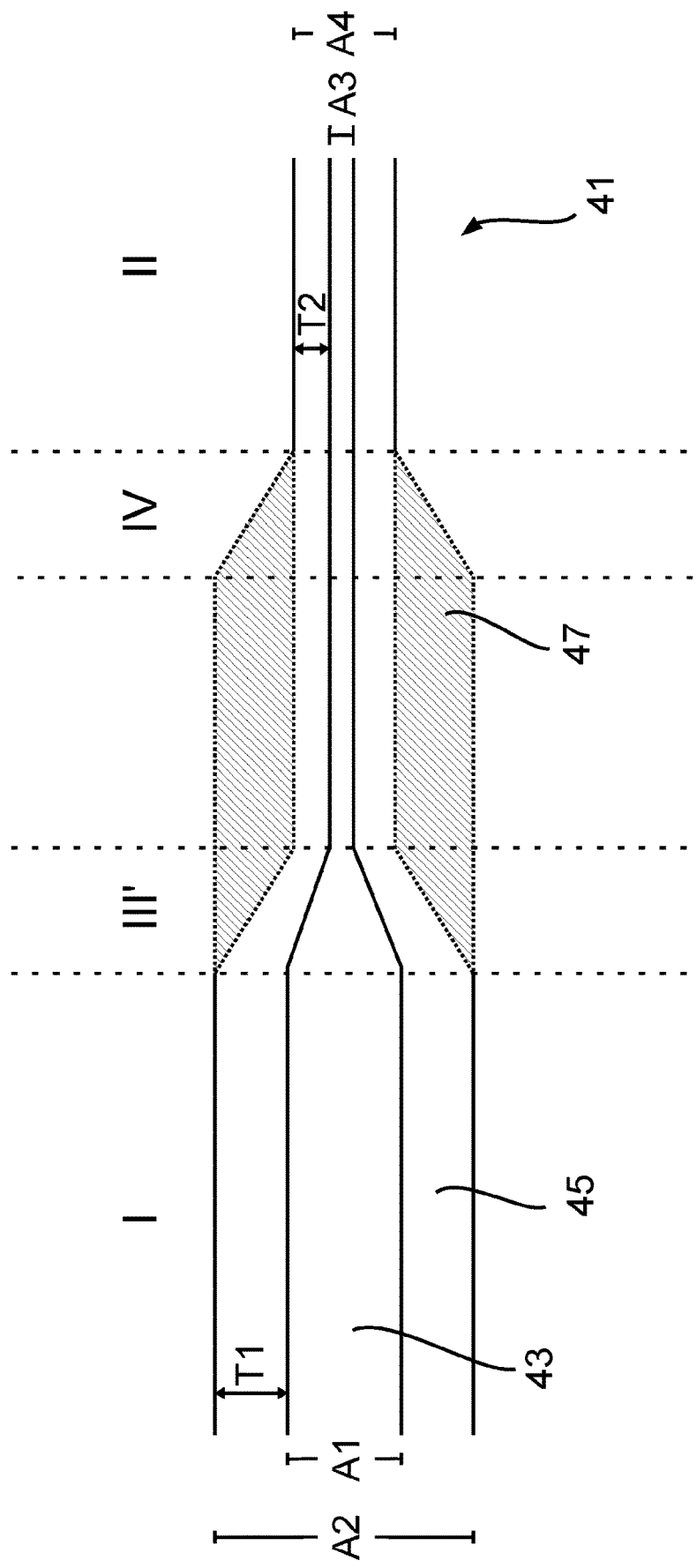
FIG. 4 schematically shows a cross-sectional view of an insulated cable according to an alternative embodiment of the invention.
Figure 5:
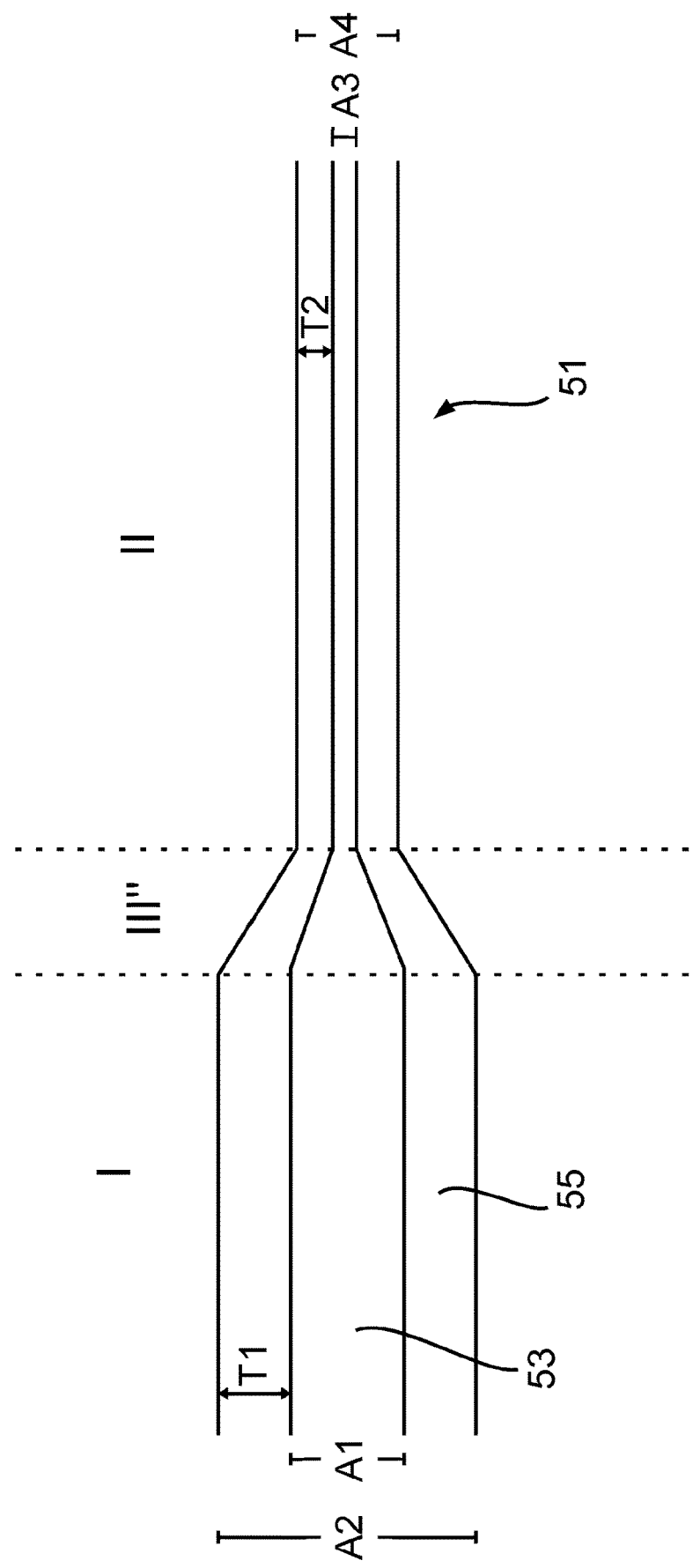
FIG. 5 schematically shows a cross-sectional view of an insulated cable according to a further alternative embodiment of the invention.

FIGS. 4 and 5 schematically illustrate alternative embodiments of insulated cables. Cable 41 and cable 51 include first lengths (I) which are substantially identical to the first lengths (I) of the cables illustrated in FIGS. 1 and 2; and second lengths (II) which are substantially identical to the second lengths (II) of the cables illustrated in FIGS. 2 and 3. Cable 41 includes a fourth length (IV) which is substantially identical to the fourth lengths (IV) of the cables illustrated in FIGS. 2 and 3.

Cable 41 also includes a third length (labelled III'). Along the third length (III') of cable 41, the core 43 changes in cross-sectional area, from A1 to A3; the insulating material 45 surrounding the core 43 changes in thickness; and the filler material 47 surrounding the insulating material 45 also changes in thickness. Therefore, in cable 41, the change in cross-sectional area of the core 43 coincides with the changes in thickness of the insulating material 45 and the filler material 47, over the length III' at the same axial position along the cable 41.

Cable 51 includes a third length (labelled III"). Along the third length (III") of cable 51, the core 53 changes in cross-sectional area, from A1 to A3, and the thickness of the insulating material changes so that the overall cable 51 changes in cross-sectional area, from A2 to A4. Cable 51 does not include any filler material 7 surrounding insulating material 5. Therefore, in cable 51, the change in cross-sectional area of the core 53 coincides with the changes in thickness of the insulating material 45 and the change in cross-sectional area of the overall cable 51, over the length III" at the same axial position along the cable 51.

As described above, the change in the core cross section provides advantages in terms of reducing the heat generated in the cable. This can provide advantages where a one length of the cable is in an environment where heat dissipation is lower or incident heat is higher, or both compared to other parts of the cable. By increasing the cross section of the core, the heat produced internally can be reduced and so the maximum temperature reached for a given set of conditions (current, environment conditions, physical arrangement etc.) can be reduced. However, it may not be essential in all arrangements to provide this improvement and so the core may maintain a constant cross sectional area along both lengths of the cable.

Similarly, increasing the thickness of the insulation in one length of a cable provides advantages in terms of the aging of the cable and its ability to continue to carry the required voltage whilst maintaining the maximum dielectric stress within defined parameters. However, it may not be necessary for all applications to provide a length with increased thickness of insulator if this issue is not a critical factor.

In other words, the cable may have two lengths where the insulator changes thickness from one length to the next but where the cross sectional area of the core conductor remains the same. Equally, the cable may have lengths where the cross sectional area of the core conductor changes from one length to the next but where the thickness remains the same. In each case, changing only the insulator thickness or only the cross sectional area of the core conductor still provides the respective advantages of improved aging properties and reduced heat generation respectively. This provides a cable with two parts having different properties which are better tailored for the location and associated environment in which they are used in service.

Figure 6A:
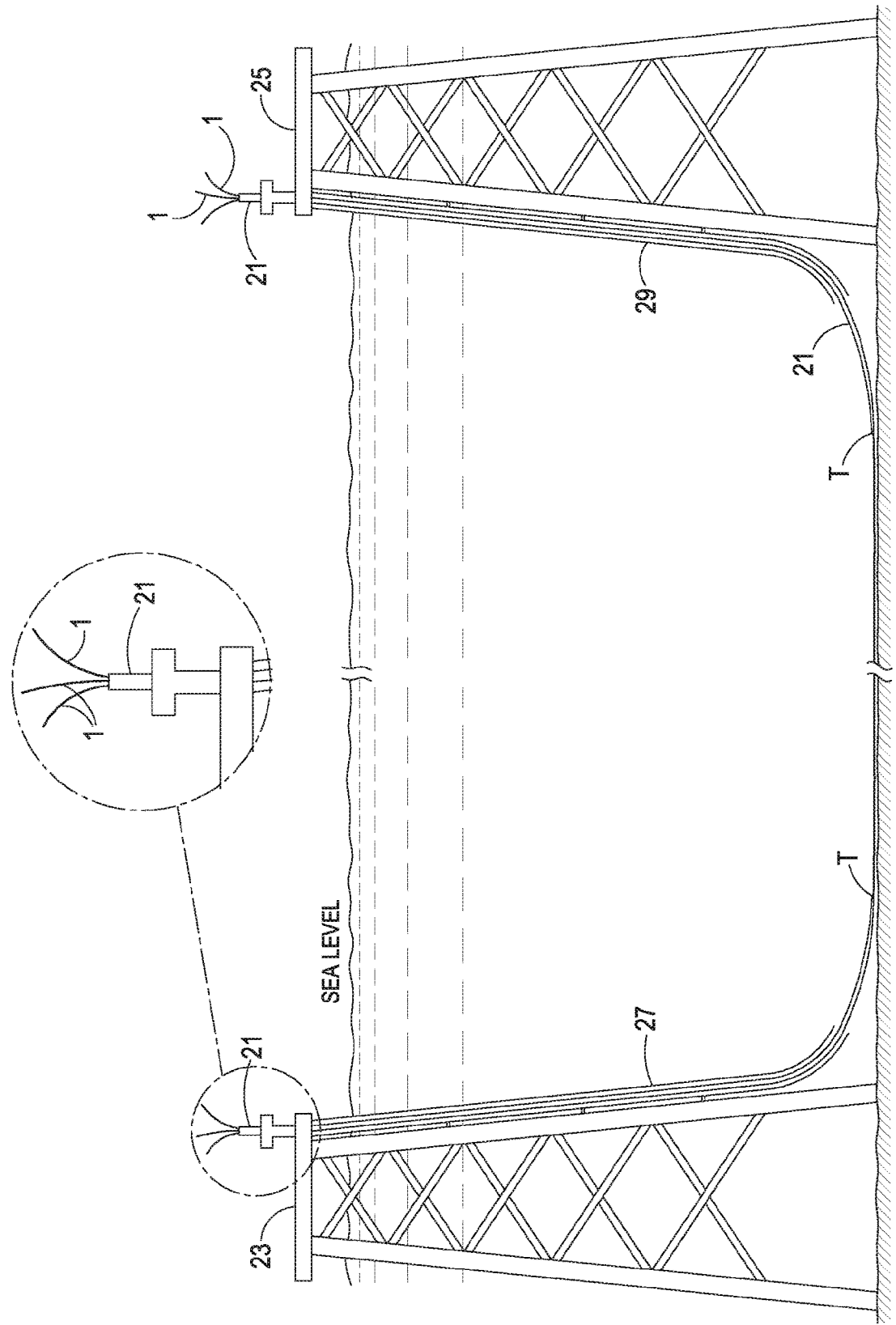
FIG. 6a schematically shows a system including a cable bundle according to an embodiment of the invention.

FIG. 6a schematically illustrates a cable bundle 21 installed in a platform to platform configuration with the cable including a section in a subsea environment. The cable bundle 21, which includes one or more cables 1, connects a first platform 23 and a second platform 25. The cable bundle 21 descends from first platform 23 through a casing 27 (or J-tube) which guides the cable bundle 21 to the seabed. The cable bundle 21 emerges from the casing 27 through an opening at the seabed end and continues along the seabed. The broken section indicates that this seabed section may be several tens of kilometres long. The cable bundle 21 reaches the second platform 25 and ascends from the seabed through a second casing 29 to the top of the second platform 25.

A cable or cable bundle may be suitable for use with different types of platform. For example, a platform may be of a fixed installation type, wherein the platform structure is fixed to the seabed and extends from the seabed to the surface of the water, or of a floating installation type, wherein the platform floats at the surface of the water and a cable or cable bundle hangs from the floating platform. Combinations of floating to floating, fixed to floating, shore to fixed and shore to floating platform may then all be possible applications of a cable or cable bundle.

The section of the cable bundle 21 that descends from the first platform 23 to the seabed is supported at its top end such that the cable bundle hangs and is under some axial tension to support its own weight. By being located in the casing 27, the cable bundle 21 is also insulated by the casing 27 from the surrounding environment. Depending on thermal conductivity, emissivity, etc. of the casing 27 this may represent a significant barrier to cooling. Part of this section of cable bundle (within the casing 27) above the water level, is surrounded by air between the cable and the casing, which may further limit the ability of the cable to be cooled. The casing 27 may also be exposed to some solar radiation, which may cause it to heat up, in turn heating the air inside and further limiting the ability of the cable to cool. This will depend again on upon the emissivity and/or transmittance of the casing 27. The lower part of the section (also within the casing 27) is surrounded by water and exposed to comparatively little solar radiation.

The section of the cable bundle 21 that rests on the seabed is under little or no axial tension but may be under comparatively high compressive stress due to the depth of the seawater above it. The section of the cable bundle 21 that rests on the seabed is exposed to comparatively little solar radiation and is not insulated by a casing. Furthermore, the relatively lower and constant bulk temperature of the seawater compared to the air in which the descending section of the cable bundle 21 operates means that the seawater acts as a relatively good heat sink for the conductive cores 3 within cable bundle 21.

The section of the cable bundle 21 that ascends from the seabed to the second platform 25 through the casing 29, like the section that descends from the first platform 23 to the seabed through casing 27, is supported at its top end and hangs such that the cable bundle 21 is under axial tension to support its own weight but relatively little compressive stress. Similarly, part of it is surrounded by water within the casing 29 and therefore exposed to relatively little solar radiation via the casing 29, while part of it is surrounded by air within the casing 29 which is exposed to comparatively high levels of solar radiation. This results in different levels of heat dissipation capacities along the length of the ascending section as well as differing amounts of external heat.

The ascending and descending sections of the cable bundle 21 need to be manufactured to operate safely for a predetermined period of time under the comparatively high axial tension, comparatively low compressive stress, comparatively high solar radiation exposure and comparatively low heat dissipation capacity of the 'in-air' parts of the ascending/descending sections.

The seabed section needs to be manufactured to operate safely for the same predetermined period of time, but under the low axial tension, higher compressive stress, low solar radiation exposure and high heat dissipation capacity of the 'undersea'. The different sections of the cable bundle therefore have very different performance requirements. For a homogenous cable, the entire length of the cable must meet the requirements for all the potential environments.

To enable the different sections of the cable bundle to meet the different requirements, the different sections are manufactured according to different parameters. The section from the first platform 23 to the seabed is manufactured with one set of parameters (e.g. core 3 cross-section of 500 mm2 and maximum dielectric stress of 4.0 kV/mm), and the seabed section is manufactured with another set of parameters (e.g. core 3 cross-section of 400 mm2 and maximum dielectric stress of 5.0 kV/mm). The sections are connected with a joint of the kinds illustrated in FIGS. 2-3. Similarly, the section from the seabed to the second platform 25 is manufactured with its own set of parameters (which may be substantially similar to or the same as those of the section between the first platform 23 and the seabed), and that section is connected to the seabed section with joints of the kinds illustrated in FIGS. 1-2.

Figure 6B:
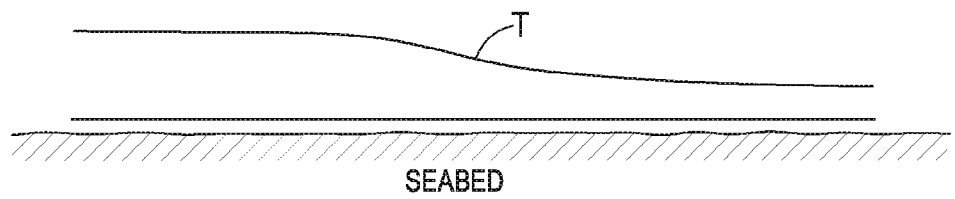

In the example of FIG. 6a, the two points at which sections of cable bundle join one another are marked 'T'. The left-hand joining point is shown in magnified view in FIG. 6b.

At this left-hand joining point, the cable bundle 21 changes in cross-sectional area from a higher cross-sectional area (for the section which descends from first platform 23 to the seabed) to a lower cross-sectional area (for the section which rests on the seabed). Within the cable bundle, the cable or cables are arranged as illustrated in either of FIG. 2 or 3. A similar joining point is provided on the right-hand side of the figure, at which the cable bundle 21 changes in cross-sectional area from a lower cross-sectional area (for the seabed section) to a higher cross-sectional area (for the section which ascends from the seabed to the second platform 25).

The first (I) and second (II) lengths of a cable extend from each side of the cable junctions for anything from a few meters to several tens of kilometres. The third, fourth and/or fifth lengths of a cable and the intervening sections may be, for example, between a few centimetres and several metres long. For example the filler material 7 typically extends between 1 m and 15 m.

Referring to FIG. 3, the filler material 7 is different lengths. The section (IV) where the filler material reduces in area is typically 1 to 4 metres and more preferably around 2 metres in length. The constant outer diameter portion of the filler material between the edge of the fourth length (IV) up to an including the fifth length (V) is typically between 1 metre and 15 metres. In the example of FIG. 3, the lengths of the filler material 7 in the three cables is different. The upper cable might typically have a length of about 9 metres of filler where the outer cross section is constant followed by typically a 2 meter taper section, in the fourth length (IV). The middle cable might have a shorter length of constant cross-section of about 6 metres followed by a 2 metre taper. The lower cable might only have a 3 metre constant cross-section part, again followed by a 2 metre taper.

Figure 7:
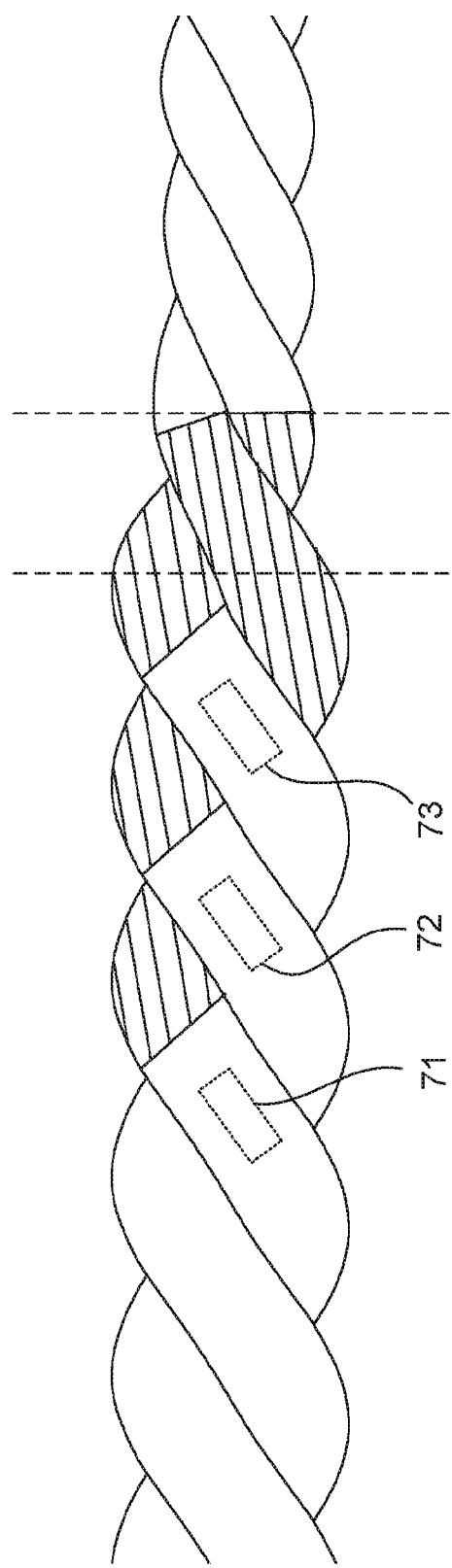
FIG. 7 schematically shows a cable bundle according to an alternative embodiment of the invention.

The cables in FIG. 3 are schematically illustrated as parallel cables to demonstrate the relative arrangements of the lengths. However, in a typical embodiment the cables in the cable bundle are helically or oscillatorily wound around each other within the casing. FIG. 7, for example, schematically illustrates a cable bundle including three intertwined insulated cables, each cable having a joint of the kind described in the context of FIGS. 2 and 3, the joints being spaced out along the length of the cable bundle. In some examples, a single cable bundle may include a first section along which the cables in the bundle are helically intertwined and twist in a first direction (e.g. twist clockwise looking along the cable bundle), an inflection point at which the direction of twist changes, and a second section along which the cables in the bundle are helically intertwined and twist in a second direction (e.g. twist anticlockwise looking along the cable bundle). Some cable bundles may include multiple inflection points, multiple sections along which the cables are helically intertwined and twist in a first direction (e.g. clockwise), and/or multiple sections along which the cables are helically intertwined and twist in a second direction (e.g. anticlockwise).

As can be seen in FIG. 7, the joints in the core 71, 72, 73 corresponding to respective length III are spaced out along the cable. However, the insulation and filler compensate for the change in diameter of the core so that the outer diameter of the cables around the joints 71-73 is substantially constant. This means that the overall dimensions of the wound cable bundle stays constant over the section of the cable bundle with the joints. This helps to give a consistent physical configuration of the cable despite the change in core dimension and the effect of the joint on the physical stiffness of the cable. Variations in the cable's physical properties can adversely affect the structure and strength of the overall cable bundle and may cause it to lay with unnecessary stresses on parts of the cable.

After the third joint 73, the filler material for all three cables continues a safe distance away from the joints before the outer dimensions of all three cable reduces (between the dashed lines). By reducing all three cables at the same time, the forces and strains are balanced, again avoiding undesirable stress concentrations. The change in outer dimensions means that the winding helix angle of the cables is preferably changed to suit the modified dimensions. As such the pitches ('lay-lengths') of the helices and/or other parameters of the helices may change. For example, the pitches of the helices could be changed near the ends of the first and second lengths of the cables (i.e. close to joints between cable sections) to enable changes in thickness of the cable bundle.

The casing of a cable bundle may enclose additional cables (power, communication, optical etc.), materials which fill gaps between the intertwined cables and/or between the cables and the casing walls, and/or materials which provide structure to the cable bundle. These additional cables and materials may need to be intertwined with the conducting cables and/or each other, or severed at different points along the length of the cable bundle, such as near the ends of the first and second lengths of cables.

A cable bundle may include any number of conducting cables—it is not limited to including three conducting cables. It may for instance include only two conducting cables, or may include four or more conducting cables depending on the circumstances. The conducting cables in the cable bundle may be arranged to provide three-phase power functionality.

Although the cables and their cores in FIG. 3 each have the same respective cross-sectional areas (A1-A4) and thicknesses (T1-T1) along their lengths, in other embodiments the dimensions of the cables may be different between the cables.

The core 3 illustrated in the figures may include one or more different types of conductive material. The core 3 may for example include copper, aluminium, or another conductive material, or an alloy or collection of different conductive materials. The core may also be made of a non-metallic conductor such as carbon nano-tube technology. The core 3 may include a single strand of conductive material or a collection of strands of conductive material, and may have a cross-sectional area in the range of 35 mm2 to 800 mm2 depending on the application.

The core may be water-blocked to prevent ingress of water in subsea applications. The dimensions of the core may be determined based on a maximum current which the core must carry, a maximum voltage which may be applied to the core, and/or a predicted ability of a cable to dissipate heat generated through resistive losses. The core 3 may be arranged for applications with a typical voltage of between 6.6 kV and 150 kV applied to it, although other voltages may be used. For example, the conductive core may conceivably be used for HV applications with operating voltages ranging from 150 kV to 400 kV. For the sake of simplicity, the core 3 in the figures is drawn in the figures as a single homogeneous structure.

The insulating material 5 illustrated in the figures may include one or more insulating materials, such as a polymeric insulating material. The insulating material 5 may be a triple-extruded insulating material. For example, with reference to the cable bundle 21 illustrated in FIG. 8, the insulating material 5 may include one or more of a conductive core screen 61, an insulation screen 65, a water tree-retardant cross-linked polyethylene (XLPE), ethylene propylene rubber (EPR) or an ethylene propylene diene monomer (EPDM) 63. The insulating material 5 might be used in combination with other types or layers of material, such as a semiconducting water-blocking tape 67, a copper tape screen 69 and/or a polyethylene sheath 70. Although one or more of the layers may be described as "water blocking", in practice it is accepted that some water may permeate through the layers and reach the insulating material 5. None of the layers is a Lead-based layer. The cable may therefore be described as a Lead-free cable. One or more of the layers may include a water-tree-retardant substance, such as a hygroscopic material arranged to absorb water that permeates into the cable as far as the layer of which is the water-tree-retardant substance is part. The hygroscopic material may for example include a desiccant contained in a polymer material.

The insulating material 5 may be applied as tape which can be wound round a core 3 and/or existing insulating material 5. The insulating material 5 may alternatively be a split tube which is approximately annular in cross-section with an axial slit along its length enabling it to be applied to and enclose a section of core and/or existing insulating material. The insulating material 5 may be fused to neighbouring sections of insulating material to ensure uniformity of the insulating material along the length of a cable. The insulating material may be chosen to withstand predetermined dielectric stresses. For example, in some embodiments, the insulating material may be chosen to withstand dielectric stresses of not less than 3 kV/mm and/or up to 5.5 kV/mm. In some embodiments, the insulating material may be chosen to withstand dielectric stresses of not less than 4.2 kV/mm and/or up to 5.0 kV/mm. Like the core 3, the insulating material 5 is drawn in the figures as a single homogeneous structure for the sake of simplicity. The insulating material is preferably formed using a water-tree retardant material to resist the formation of water trees which can lead to premature failure or a shortening of acceptable service life of the cable.

Some power cables (such as land-based power cables) have maximum current or voltage ratings and/or maximum dielectric stress ratings corresponding to ratings defined in international standards (such as IEC 60287). However, cables according to embodiments of this invention may have different ratings along their lengths, and those ratings may be different from the ratings defined in standards due to the combinations of factors (e.g. solar radiation exposure, ambient air/water temperature, casing, axial tension, compressive stress) discussed earlier.

For example, a cable according to an embodiment of this invention might have a seabed section provided with a conductive core of such a diameter and insulating material of such a thickness that the seabed section of cable has a dielectric stress (e.g. 6 kV/mm) greater than that allowed by one or more international standards.

The same cable might also have one or more ascending/descending sections provided with a conductive core of such a diameter and insulating material of such a thickness that the ascending/descending sections have a dielectric stress (e.g. 4.2 kV/mm) equal to or lower than that required by the same one or more international standards.

However, the respective reliability of the different sections of cable will be approximately the same, because the seabed section of cable experiences a compressive stress, has an effective heat sink (the seawater), is exposed to relatively little solar radiation and is not enclosed by any kind of casing—all of which can contribute to relatively slow wet-ageing effects—while the ascending/descending sections of cable are under axial tension, are exposed (in some parts) to relatively high solar radiation, are enclosed in a protective casing, and are surrounded by air (rather than water) as a heat sink—all of which can contribute to relatively quick wet-ageing effects.

The filler material 7 may serve one or more purposes. It may serve to maintain the cross-sectional area of a cable at a roughly constant value despite a reduction in thickness of the insulating material 5 of the cable. The filler material 7 might alternatively or additionally provide structural support to the cable, contribute to the insulation of the cable, provide an aesthetic outer exterior to the cable (suitable for identifying the cable, for example), fill space between neighbouring cables in a cable bundle, provide a semiconducting layer to the cable, and/or serve a number of other purposes.

Figure 8:
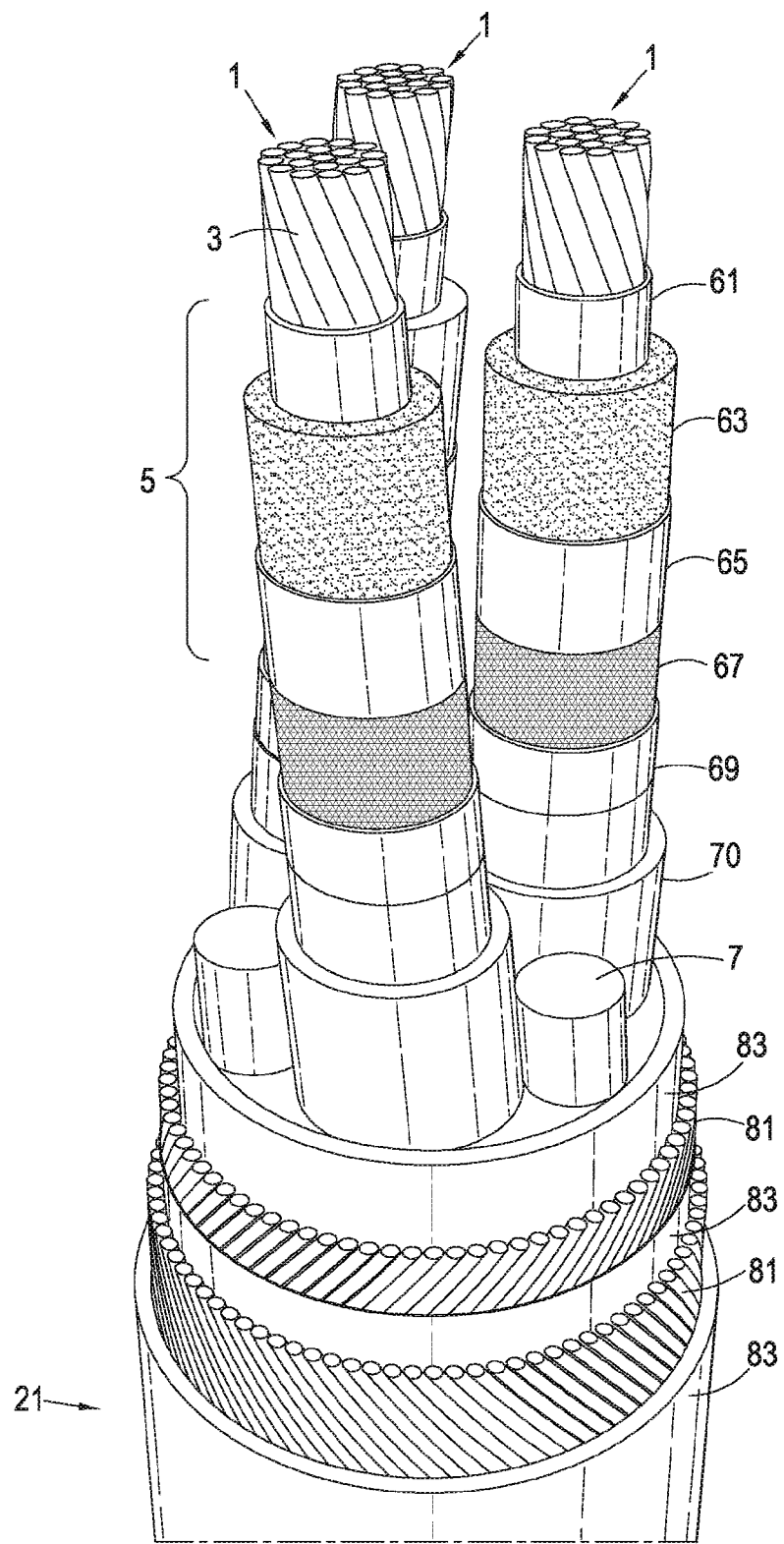
FIG. 8 schematically shows a cable bundle according to an embodiment of the invention.

Although the filler material 7 is illustrated as surrounding the insulating material 5, there might be strands, blocks or other shapes of filler material within the cable bundle as required, such as the tubes of filler material 7 illustrated in FIG. 8. Like the insulating material 5, the filler material 7 might include one or more types of filler material (such as XLPE or EPDM, PVC, PE, TPR), but is drawn as a single homogeneous structure for the sake of simplicity. The filler layer is typically not providing a critical insulating function like the layer of insulating material 5 and the material constraints are therefore less strict. This allows the construction and choice of materials of the filler layer to be less rigorous. However, there is no reason why the filler material cannot be of similar quality to the insulating material 5 or even the same.

Cables according to embodiments of the invention may also include one or more armouring layers to help support conductive cores within the cables. Armouring layers are typically formed from metal wires formed into a sheath around the cable bundles, potentially with additional layers or fillers between the armour layer and the cable bundle. Further layers are typically applied outside the armour layer to provide resistance to wear and prevent corrosion of the armour layer. Examples of such armouring layers 81 and additional/further layers 83 are illustrated in FIG. 8. The armouring is applied in a continuous manner along the entire length of the cable, protecting the mechanical integrity of the joint (also referred to as a "splice") and obviating the need for a rigid mechanical joint to transition between different cable sections. This provides for simpler installation and handling of the cable as joint or splice has dimensions that are close to or the same as the cable. This avoids the need for special treatment of the cable at the joint when loading or unloading.

As illustrated in the figures, a cable including one or more of a first length, a second length, a third length, a fourth length and a fifth length may include other lengths. The other lengths may be intervening lengths—positioned between the first, second, third, fourth and/or fifth lengths—as shown in the figures (e.g. FIG. 1, which shows an unnamed length positioned between the third length and the fifth length, and an unnamed length positioned between the fifth length and the fourth length). Alternatively, some or all of the first to fifth lengths may be contiguous with each other.

In the figures, changes in core cross-sectional area are illustrated (e.g. in length 'III' of FIG. 2) as roughly constant changes in core diameter, and changes in cable cross-sectional area are illustrated (e.g. in length 'IV' of FIG. 2) as roughly constant changes in cable diameter. However, in other examples, different changes of core diameter and/or cable diameter are possible. A core or cable diameter may, for instance, change in a stepped fashion or a non-linear fashion. When transitioning from one cross-sectional area to another (smaller) cross-sectional area, the cross-sectional area may increase as well as decrease over the transition (such as by bulging).

A change in diameter may be imprecise in form, such as if the process used to join one length of core/cable to the next length of core/cable produces variable and/or unpredictable results (bulges, jagged lines, or sudden changes in profile). Additionally, the cross-section of the cable and the cross-section of the core may take other forms than circular. The cross-sections may for example have a more triangular, square, pentagonal, hexagonal, etc. shape, or be imprecise or variable in form. Moreover, the cable may have a different cross-sectional shape from the core, and their cross-sectional shapes may change along the lengths of cable. This applies also to a cable bundle, which may be similarly imprecise or variable in cross-section, and which may vary in cross-section from the cables and cores within.

Although in the embodiment of FIG. 3 the cables in the cable bundle include only non-overlapping third, fourth and fifth lengths, in other embodiments, one or more of the third, fourth and fifth lengths of any given cable may partially or completely overlap with each other and/or with the third, fourth and/or fifth lengths of other cables in the cable bundle. The cables in the cable bundle may take the form of cables 41 and/or 51 (FIGS. 4-5) rather than the cable 1 (FIG. 2).

The example of FIG. 6 is described in terms of a cable bundle which includes one or more insulated cables of the types illustrated in FIGS. 2 and 3. The cable bundle may equally include cables of the types illustrated in FIGS. 4 and 5. Although the words 'cable bundle' are used, the first platform 23 and second platform 25 could be connected by one insulated cable of the kind illustrated in any of FIG. 2, 4 or 5.

While FIG. 6 illustrates three sections of cable bundle (and two joints between them), other arrangements may include smaller or bigger numbers of cable bundle sections. For example, in a similar situation to that illustrated in FIG. 6, there may be two or more sections of cable bundle in the ascending/descending parts to match the cable requirements more closely to the different parts (one 'in-air' part with comparatively high solar radiation exposure and low heat dissipation and one 'in-water' part with comparatively low solar radiation exposure and high heat dissipation). There might be multiple sections on the seabed portion if, for example, part of the cable bundle on the seabed is positioned close to a geothermal feature, another cable, or different seabed terrain requiring a different, more durable cable construction. Furthermore, a cable may only include two sections, for example if the cable goes from a platform and terminates at a location on the seabed. As such, no second transition to the surface would be required.

The invention claimed is:

1. An insulated submarine cable including a continuous conductive core and a continuous insulating material surrounding the core, wherein the cable includes:
    a first length along which the core has a cross-sectional area A1 and the insulating material has a thickness T1;
    a second length along which the core has a cross-sectional area A3, less than the cross-sectional area A1 of the first length, and the insulating material has a thickness T2, less than the thickness T1 of the first length; and
    a joint arranged between the first length and the second length, the joint including:
        a third length along which the core changes in cross-sectional area progressively tapering from A1 to A3 and the thickness of the insulating material does not reduce; and a fourth length, between and axially offset from the third length and the second length without overlapping either, along which the thickness of the insulating material progressively reduces to T2, such that the position of the reduction in the core cross-sectional area and the reduction in the insulating material thickness are in separate, axially offset parts of the joint.

2. An insulated submarine cable as claimed in claim 1, wherein the thickness of the insulating material remains substantially constant along the third length.

3. An insulated submarine cable as claimed in claim 1, wherein the cross-sectional area of the core remains constant along the fourth length.

4. An insulated submarine cable as claimed in claim 1, including a filler length comprising filler material provided around the insulating material and extending along the fourth length and a portion of the second length, wherein the filler material increases in thickness as the insulating material surrounding the core decreases in thickness.

5. An insulated submarine cable as claimed in claim 1, wherein the cross-sectional area of the cable remains constant along the fourth length.

6. An insulated submarine cable as claimed in claim 1, wherein the portion of the core in the third length includes an induction-brazed taper joint.

7. An insulated submarine cable as claimed in claim 1, wherein the lengths are distributed axially along the cable over a distance of between 1 metre and 20 metres.

8. An insulated submarine cable as claimed in claim 4, wherein the first length is or forms part of a first cable section, the first cable section having a constant core cross-sectional area A1 and a constant insulating material thickness T1; the second length is or forms part of a second cable section, the second cable section having a constant core cross-sectional area A3 and a constant insulating material thickness T2; and the third, fourth and filler lengths are or form parts of a joint connecting the first cable section and the second cable section.

9. An insulated submarine cable as claimed in claim 1, wherein the cable is a lead-free cable.

10. An insulated submarine cable as claimed in claim 1, including a water-tree retardant substance.

11. An insulated submarine cable as claimed in claim 1, wherein said insulating material is an ethylene based polymer.

12. A submarine cable bundle comprising a plurality of insulated cables as claimed in claim 1.

13. A submarine cable bundle as claimed in claim 12, wherein the cables in the bundle are arranged such that the respective third lengths of each of the cables, located between the first length and the second length of the cable and along which the core changes in cross-sectional area, are positioned such that they do not coincide with each other at the same axial position along the cable bundle.

14. A submarine cable bundle as claimed in claim 12, wherein the cables in the bundle are arranged such that the respective fourth lengths of each of the cables, located between the first and second lengths of the cable and along which the insulating material of the cable changes in thickness and filler material surrounding the insulating material changes in thickness, are positioned such that they do not coincide with each other at the same axial position along the cable bundle.

15. A submarine cable bundle comprising a plurality of insulated cables as claimed in claim 4, wherein the respective filler lengths of the cables are positioned such that they at least partially overlap each other along a portion of the cable bundle.

16. A submarine cable bundle as claimed in claim 12, wherein the cables in the cable bundle are helically or oscillatorily intertwined.

17. An insulated submarine cable as claimed in claim 1, wherein the cross-sectional area of the cable remains constant along the third length.

* * * * *